United States Patent
Degroot, Jr. et al.

(10) Patent No.: US 12,129,407 B2
(45) Date of Patent: Oct. 29, 2024

(54) SILICONE ADHESIVE COMPOSITION AND USE THEREOF

(71) Applicants: Dow Toray Co., Ltd., Tokyo (JP); Dow Silicones Corporation, Midland, MI (US)

(72) Inventors: Jon Degroot, Jr., Midland, MI (US); Haruhiko Furukawa, Ichihara (JP); Tomohiro Iimura, Ichihara (JP); Eun Sil Jang, Midland, MI (US); Eric E. Joffre, Midland, MI (US)

(73) Assignees: DOW SILICONES CORPORATION, Midland, MI (US); DOW TORAY CO., LTD., Tokyo (JP)

( * ) Notice: Subject to any disclaimer, the term of this patent is extended or adjusted under 35 U.S.C. 154(b) by 673 days.

(21) Appl. No.: 17/413,087

(22) PCT Filed: Dec. 5, 2019

(86) PCT No.: PCT/JP2019/047548
§ 371 (c)(1),
(2) Date: Sep. 10, 2021

(87) PCT Pub. No.: WO2020/121930
PCT Pub. Date: Jun. 18, 2020

(65) Prior Publication Data
US 2022/0282142 A1  Sep. 8, 2022

Related U.S. Application Data

(60) Provisional application No. 62/779,240, filed on Dec. 13, 2018.

(51) Int. Cl.
| | | |
|---|---|---|
| *B32B 41/00* | (2006.01) | |
| *C09J 7/29* | (2018.01) | |
| *C09J 7/38* | (2018.01) | |
| *C09J 183/06* | (2006.01) | |

(52) U.S. Cl.
CPC ............... *C09J 183/06* (2013.01); *C09J 7/29* (2018.01); *C09J 7/38* (2018.01); *C09J 2203/326* (2013.01); *C09J 2301/302* (2020.08)

(58) Field of Classification Search
CPC ..... C09J 183/06; C09J 7/29; C09J 7/38; C09J 2203/326; C09J 2301/302; C09J 2203/318; C09J 2301/312; C09J 2483/00; C09J 183/04; C09J 7/20; C08L 83/04; C08L 83/00; C08G 77/12; C08G 77/20; C08G 77/70
USPC .................... 156/60, 64, 350, 351, 378, 379
See application file for complete search history.

(56) References Cited

U.S. PATENT DOCUMENTS

| | | | |
|---|---|---|---|
| 5,366,809 A | 11/1994 | Schmidt et al. | |
| 6,703,120 B1 * | 3/2004 | Ko | ........................ C09J 183/04 |
| | | | 428/401 |
| 2006/0189767 A1 | 8/2006 | Bhagwagar et al. | |
| 2008/0242807 A1 | 10/2008 | Aoki | |
| 2012/0045635 A1 | 2/2012 | Aoki | |
| 2012/0231245 A1 | 9/2012 | Kim et al. | |
| 2013/0069890 A1 | 3/2013 | Lee et al. | |
| 2015/0133594 A1 | 5/2015 | Ihara et al. | |
| 2016/0053148 A1 | 2/2016 | Tsuchida | |
| 2019/0300767 A1 | 10/2019 | Fukui et al. | |
| 2020/0087514 A1 | 3/2020 | Fukui et al. | |
| 2020/0164613 A1 | 5/2020 | Fukui et al. | |

FOREIGN PATENT DOCUMENTS

| | | |
|---|---|---|
| CN | 104364339 A | 2/2015 |
| CN | 105102576 A | 11/2015 |
| EP | 0537784 A1 | 4/1993 |
| JP | H0684494 B2 | 10/1994 |
| JP | 2006160923 A | 6/2006 |

(Continued)

OTHER PUBLICATIONS

English translation of International Search Report for PCT/JP2019/047548 dated Feb. 10, 2020, 3 pages.
Machine assisted English translation of JPH0684494B2 obtained from https://patents.google.com/patent on Sep. 9, 2021, 6 pages.
Machine assisted English translation of JP2006160923A obtained from https://patents.google.com/patent on Sep. 9, 2021, 10 pages.
Machine assisted English translation of WO2016139955A1 obtained from https://patents.google.com/patent on Sep. 9, 2021, 9 pages.
Machine assisted English translation of WO2016139956A1 obtained from https://patents.google.com/patent on Sep. 9, 2021, 9 pages.
Machine assisted English translation of JP2013233852A obtained from https://patents.google.com/patent on Sep. 10, 2021, 9 pages.

(Continued)

*Primary Examiner* — Michael N Orlando
*Assistant Examiner* — Joshel Rivera
(74) *Attorney, Agent, or Firm* — WARNER NORCROSS + JUDD LLP

(57) ABSTRACT

Provided is a silicone adhesive composition and an application thereof, that has a viscosity that enables coating even with a small amount of solvent content, has excellent curability due to hydrosilylation reaction, cures, has sufficient adhesive strength for practical use, and has excellent mechanical strength and elongation of the adhesive layer after curing, and can form a pressure-sensitive adhesive layer having sufficient adhesive strength for practical use. The adhesive composition comprises: (A) a chain-like organopolysiloxane having at least two aliphatic unsaturated carbon-carbon bond-containing groups only at the terminals of the molecular chain; (B) a straight-chain organohydrogenpolysiloxane having silicon-bonded hydrogen atoms only at both terminals of the molecular chain; (C) a resinous organopolysiloxane; and (D) an organopolysiloxane having at least one or more aliphatic unsaturated carbon-carbon bond-containing groups at locations other than the ends of the molecular chain, and having three or more aliphatic unsaturated carbon-carbon bond groups in the molecule.

12 Claims, No Drawings

(56) References Cited

FOREIGN PATENT DOCUMENTS

| | | |
|---|---|---|
| JP | 2006520838 A | 9/2006 |
| JP | 2008274251 A | 11/2008 |
| JP | 2012041505 A | 3/2012 |
| JP | 5130995 B2 | 1/2013 |
| JP | 2013065009 A | 4/2013 |
| JP | 2013512326 A | 4/2013 |
| JP | 2013233852 A | 11/2013 |
| JP | 2014063064 A | 4/2014 |
| JP | 2014082335 A | 5/2014 |
| JP | 2014522436 A | 9/2014 |
| JP | 2017047767 A | 3/2017 |
| WO | 2012166870 A1 | 12/2012 |
| WO | 2013123619 A1 | 8/2013 |
| WO | 2016139955 A1 | 9/2016 |
| WO | 2016139956 A1 | 9/2016 |
| WO | 2018056297 A1 | 3/2018 |
| WO | 2018056298 A1 | 3/2018 |
| WO | 2018079678 A1 | 5/2018 |

OTHER PUBLICATIONS

Machine assisted English translation of JP2014063064A obtained from https://patents.google.com/patent on Sep. 10, 2021, 9 pages.
Machine assisted English translation of JP2014082335A obtained from https://patents.google.com/patent on Sep. 10, 2021, 12 pages.
Machine assisted English translation of JP2017047767A obtained from https://patents.google.com/patent on Sep. 10, 2021, 9 pages.

* cited by examiner

SILICONE ADHESIVE COMPOSITION AND USE THEREOF

CROSS-REFERENCE TO RELATED APPLICATIONS

This application is the National Stage of International Appl. No. PCT/JP2019/047548 filed on 5 Dec. 2019, which claims priority to and all advantages of U.S. Provisional Patent Application No. 62/779,240 filed on 13 Dec. 2018, the content of which is hereby incorporated by reference.

TECHNICAL FIELD

The present invention relates to a silicone adhesive composition. The present invention also relates to applications such as an adhesive layer or elastic adhesive member made by curing said composition, a laminate including an adhesive layer made by curing said composition, and the like.

BACKGROUND ART

Polysiloxane pressure sensitive adhesive compositions have excellent electrical insulating properties, heat resistance, cold resistance, and adhesion to various adherends in comparison to acrylic or rubber-based pressure sensitive adhesive compositions and are therefore used in heat-resistant adhesive tapes, electrically insulating adhesive tapes, heat seal tapes, plating masking tapes, and the like. These polysiloxane pressure sensitive adhesive compositions are classified into addition reaction curing types, condensation reaction curing types, peroxide curing types, and the like based on the curing mechanisms thereof. Addition reaction curing type pressure sensitive adhesive compositions are widely used because the compositions cure quickly when left to stand at room temperature or by heating and do not generate by-products.

Taking advantage of the above characteristics of polysiloxane pressure sensitive adhesives as well as characteristics which can achieve high transparency thereof as required, applications to the field of advanced electronic materials and display elements such as smart devices have been investigated in recent years. Such a device assumes a structure in which a film made of a plurality of layers, including an electrode layer and a display layer, is sandwiched between transparent substrates, with a polysiloxane pressure sensitive adhesive having excellent heat resistance and cold resistance expected to work effectively for the purpose of protecting the electrode layer and the display layer and improving adhesion between layers.

However, since polysiloxane pressure-sensitive adhesives are generally commercialized after being dissolved in organic solvents, applications thereof have been limited. Especially in recent years, development of solvent-free polysiloxane pressure-sensitive adhesives has been strongly desired due to the direction of environmental regulations around the world. For example, patent documents 1-4 disclose solvent-free polysiloxane pressure-sensitive adhesives, but compared to solvent-type polysiloxane pressure-sensitive adhesives, improvements were desired in terms of the mechanical strength and elongation of the pressure-sensitive adhesives themselves.

RELATED ART DOCUMENTS

Patent Documents

Patent Document 1: Japanese Published Examined Application H6-84494
Patent Document 2: Japanese Unexamined Patent Application 2006-160923
Patent Document 3: Japanese Patent No. 5130995
Patent Document 4: Japanese Unexamined Patent Application 2012-41505

SUMMARY OF THE INVENTION

Problem to be Solved by the Invention

In order to resolve the problems described above, an object of the present invention is to provide a curing-reactive organopolysiloxane composition with a viscosity where coating is possible even with small solvent content, has excellent curability where the polyorganosiloxane pressure-sensitive adhesive that forms by the curing reaction has good mechanical strength and elongation, and which forms a pressure-sensitive adhesive layer with sufficient adhesive force for practical use. Further, an object of the present invention is to provide the use of this curing reactive silicone adhesive composition or cured product thereof as a pressure-sensitive adhesive layer, as an elastic adhesive member in a wide range of applications, and as devices or apparatuses equipped therewith.

Means for Solving the Problem

As a result of conducting diligent research on the problems described above, the present inventors arrived at the present invention. In other words, one of the objects of the present invention can be achieved by the following.

[1] A silicone adhesive composition containing:
- (A) a straight-chain or branched chain organopolysiloxane having at least two aliphatic unsaturated carbon-carbon bond-containing groups only at the ends of the molecular chain and a degree of siloxane polymerization of 5 to 10,000;
- (B) a straight-chain organohydrogenpolysiloxane having silicon-bonded hydrogen atoms only at both terminals of the molecular chain;
- (C) an organopolysiloxane resin containing, in a molecule, a siloxane unit (M unit) as expressed by $R_3SiO_{1/2}$ (where R mutually independently represents a monosaturated organic group) and a siloxane unit (Q unit) as expressed by $SiO_{4/2}$;
- (D) an organopolysiloxane having at least one or more aliphatic unsaturated carbon-carbon bond-containing groups at locations other than the terminals of the molecular chain of the straight-chain or branched-chain siloxane, and having at least three or more aliphatic unsaturated carbon-carbon bond groups in the molecule; and
- (E) a hydrosilylation reaction catalyst;

where:
the ratio of the number of moles of silicon-bonded hydrogen atoms in component (B) to the number of moles of aliphatic unsaturated carbon-carbon bond-containing groups in components (A) to (D) is in the range of 0.70 to 1.30, and
the amount of substance of the aliphatic unsaturated carbon-carbon bond-containing groups in component (D) is achieved by the silicone adhesive composition being in the range of 0.001 to 0.030 in 100 g of the total amount of components (A) to (D) in the composition.

The problems of the present invention may also be suitably solved by the following silicone adhesive composition.

[2] The silicone adhesive composition according to [1], wherein when the total amount of components (A) to (D) is 100 parts by mass,
the total amount of components (A) and (B) is in the range of 10 to 80 parts by mass,
the amount of components (C) is in the range of 10 to 80 parts by mass,
the amount of component (D) is in the range of 0.01 to 20 parts by mass.
[3] The silicone adhesive composition according to [1] or [2], wherein the component (D) is a component (D1), component (D2), or a mixture thereof, as follows:
(D1) a straight-chain or branched-chain organopolysiloxane having at least three aliphatic unsaturated carbon-carbon bond-containing groups at the side molecular chains and a degree of siloxane polymerization of 5 to 5,000;
(D2) an organopolysiloxane that at least contains, in the molecule thereof, a siloxane unit ($M^{Vi}$ unit) expressed by (Alk) $R'_2SiO_{1/2}$ (in which Alk independently represents an aliphatic unsaturated carbon-carbon bond-containing group and R' independently represents an aliphatic unsaturated carbon-carbon bond non-containing group) and a siloxane unit (Q unit) represented by $SiO_{4/2}$, wherein the content of the vinyl ($CH_2=CH-$) portion in the aliphatic unsaturated carbon-carbon bond-containing group in the molecule is at least 0.1 mass %.
[4] The silicone adhesive composition according to any one of [1] to [3], wherein the content of organic solvents is 20 mass % or less of the entire composition.
[5] The silicone adhesive composition according to any one of [1] to [4], wherein the pressure-sensitive adhesive layer having a thickness of 40 μm obtained by curing the composition is characterized in that the adhesive force measured at a tensile speed of 300 mm/min using the 180° peel test method according to JIS Z0237 relative to a SUS substrate is in the range of 100 to 2500 gf/inch.

Similarly, the problems of the present invention may be suitably solved by the following pressure-sensitive adhesive layers, laminates, elastic adhesive members and applications thereof.
[6] A pressure-sensitive adhesive layer comprising a cured silicone adhesive composition according to any one of [1] to [5].
[7] A laminate body provided with, on a film-like substrate, a pressure-sensitive adhesive layer comprising a cured silicone adhesive composition according to any one of [1] to [5].
[8] The laminate body according to [7], wherein one or two or more film-like substrates are included, and a release layer for the pressure-sensitive adhesive layer is provided on the film layers.
[9] The laminated body according to [8], comprising:
a film-like substrate;
a first release layer formed on the film-like substrate;
a pressure-sensitive adhesive layer formed by coating and curing the silicone adhesive composition according to any one of [1] to [5] on the release layer; and
a second release layer laminated on the pressure-sensitive adhesive layer.
[10] An elastic adhesive member comprising a cured silicone adhesive composition according to any one of [1] or [5].
[11] Electronic equipment or electrical devices that include the elastic adhesive member according to [10].

Effects of the Invention

The silicone adhesive composition of the present invention has a viscosity that enables coating even with a small amount of solvent content, has excellent curability due to hydrosilylation reaction, cures, has sufficient adhesive strength for practical use, and has excellent mechanical strength and elongation of the adhesive layer after curing, and can form a pressure-sensitive adhesive layer having sufficient adhesive strength for practical use. Furthermore, the cured product of the silicone adhesive composition can be suitably used as a pressure-sensitive adhesive layer, an electronic material, or a member for a displaying device, and electrical or electronic part or a displaying device equipped with the silicone adhesive composition can form a pressure-sensitive adhesive layer that does not cause adhesion problems to a substrate of an electronic part and the like in a temperature range including from low temperatures up to room temperatures, as the adhesive layer has sufficient viscoelasticity over a wide range of temperatures, and thus has the advantage that produce-ability of the electronic part or the like is easy and improvement in the performance of the obtained electronic part or the like is anticipated.

DESCRIPTION OF THE PREFERRED EMBODIMENT

Silicone Adhesive Composition

First, the silicone adhesive composition of the present invention will be described. The composition cures quickly by a curing reaction including a hydrosilylation reaction, and forms a pressure-sensitive adhesive layer having sufficient adhesive force for practical use and a pressure-sensitive adhesive layer having excellent mechanical strength and elongation. Each component thereof, the range of organopolysiloxane that is a technical feature, the mass ratio of organopolysiloxane resin relative to its chain organopolysiloxane, and the characteristics of the pressure-sensitive adhesive layer are described below.

Specifically, the silicone adhesive composition of the present invention contains:
(A) a straight-chain or branched chain organopolysiloxane having at least two aliphatic unsaturated carbon-carbon bond-containing groups at the ends of the molecular chains and a degree of siloxane polymerization in the range of 5 to 10,000;
(B) a straight-chain organohydrogenpolysiloxane having silicon-bonded hydrogen atoms only at both terminals of the molecular chain;
(C) an organopolysiloxane resin containing, in a molecule, a siloxane unit (M unit) as expressed by $R_3SiO_{1/2}$ (where R mutually independently represents a monosaturated organic group) and a siloxane unit (Q unit) as expressed by $SiO_{4/2}$;
(D) an organopolysiloxane having at least one or more aliphatic unsaturated carbon-carbon bond-containing groups at locations other than the terminals of the molecular chain of the straight-chain or branched-chain siloxane, and having at least three or more aliphatic unsaturated carbon-carbon bond groups in the molecule; and
(E) a hydrosilylation reaction catalyst;
and from the perspective of handleability, (F) a curing retarder, and other additives can be included if desired to the extent that they do not conflict with the purpose of the present invention.
Hereinafter, each component will be described.

Component (A)

Component (A) is a straight-chain or branched chain organopolysiloxane having at least two aliphatic unsaturated carbon-carbon bond-containing groups only at the ends of the molecular chain and a degree of siloxane polymerization in the range of 5 to 10,000, and is the main agent (base polymer) of this composition. Component (A) forms a structure in which the molecular chain length is stretched by a chain length extension reaction with component (B) in the hydrosilylation reaction, and is a component that improves the elongation and flexibility of the curing reactant (adhesive agent layer). By using a specific amount of such component (A) together with component (B), a structure with a stretched molecular chain length is included above a certain level in the curing reactant obtained by curing the composition, and the adhesiveness and high temperature retention as an elastic adhesive member are remarkably improved. Here, the high temperature holding power of the pressure-sensitive adhesive refers to the property that allows the adhesive to maintain its bonding power even at high temperatures without shifting the bonding position between the substrates or separating the two substrates when two substrates are bonded using the pressure-sensitive adhesive. Furthermore, since the degree of siloxane polymerization of component (A) is not so large by itself, the overall viscosity of the composition can be reduced, the amount of organic solvent used can be reduced to a minimum, and even then sufficient practical coatability can be achieved. In other words, even without the use of high molecular weight and high viscosity gum-like cured reactive organopolysiloxane, a cured material can have excellent adhesiveness and high temperature retention as an elastic adhesive member, and the coatability thereof can be improved with almost no use of organic solvents. Such a component (A) may be a single organopolysiloxane or a mixture of two or more organopolysiloxanes.

The degree of siloxane polymerization of such organopolysiloxane, which is the component (A), is in the range of 5 to 10,000, preferably in a range of 5 to 9,000, and more preferably in a range of 5 to 8,000. Component (A) may be an organopolysiloxane having a (A1) degree of siloxane polymerization in the range of 5 to 30, or a mixture of component (A1) and an organopolysiloxane having a (A2) degree of siloxane polymerization in the range of 31 to 10,000, preferably in the range of 31 to 9,000. If the degree of siloxane polymerization of component (A) exceeds the upper limit described above, the viscosity of the entire composition tends to increase, and coating may become difficult unless a large amount of organic solvent is used. On the other hand, if the degree of siloxane polymerization of component (A) is less than the lower limit described above, the curability and adhesive performance of the composition may be degraded. From the viewpoint of the technical effect of the present invention, it is preferable that 50 mass % or more of component (A) is an organopolysiloxane having a (A1) degree of siloxane polymerization in the range of 5 to 30, which has the advantage of reducing the overall viscosity of the composition.

The organopolysiloxane, which is component (A), has at least two aliphatic unsaturated carbon-carbon bond-containing groups only at the terminals of the molecular chain in order to extend the molecular chain length by chain lengthening reaction. Examples of such aliphatic unsaturated carbon-carbon bond-containing groups include an alkenyl group, an alkenyloxyalkyl group, an acryloxyalkyl group or a methacryloxyalkyl group, and an alkenyl group is particularly preferred. Specifically, the alkenyl group is a vinyl group, an allyl group, a propenyl group, a butenyl group, a pentenyl group, a hexenyl group, and the like, and the vinyl group or the hexenyl group is particularly preferred. These aliphatic unsaturated carbon-carbon bond-containing groups are also preferably bonded to silicon atoms.

The content of the aliphatic unsaturated carbon-carbon bond-containing groups is preferably 0.001 to 10 mass % of component (A), preferably 0.005 to 8.5 mass %, and more preferably 0.01 to 7.5 mass %. In particular, a content of the vinyl ($CH_2=CH$—) portion in the aliphatic unsaturated carbon-carbon bond-containing group (hereinafter referred to as the "vinyl content") in the range of 0.005 to 10.0 mass % is preferable, and a range of 0.005 to 8.5 mass % is particularly preferable.

Component (A) may include, as an organic group other than an aliphatic unsaturated carbon-carbon bond-containing group, an alkyl group such as a methyl group, an ethyl group, a propyl group, a butyl group, a pentyl group, a hexyl group, a heptyl group, or the like; an aryl group such as a phenyl group, a tolyl group, a xylyl group, a naphthyl group, or the like; an aralkyl group such as a benzyl group, a phenethyl group, and the like; an aralkyl group such as a phenethyl group; and an alkyl halide group such as a chloromethyl group, a 3-chloropropyl group, and a 3,3,3-trifluoropropyl group. From an industrial point of view, it is particularly preferable to include methyl and phenyl groups.

Such a component (A) is preferably a straight-chain organopolysiloxane expressed by the formula:

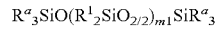

$$R^a{}_3SiO(R^1{}_2SiO_{2/2})_{m1}SiR^a{}_3$$

However, component (A) may contain, in part, units selected from the group consisting of branched siloxane units represented by $R^1SiO_{3/2}$ and branched siloxane units represented by $SiO_{4/2}$ in an average range of 0 to 5 units per molecule, and thus may be a branched-chain organopolysiloxane.

In the formula, each $R^1$ is independently exemplified by an organic group other than an aliphatic unsaturated carbon-carbon bond-containing group. In addition, $R^a$ is an aliphatic unsaturated carbon-carbon bond-containing group or $R^1$, and at least two $R^a$ in one molecule are aliphatic unsaturated carbon-carbon bond-containing groups, preferably alkenyl groups, more preferably vinyl groups or hexenyl groups. The degree of siloxane polymerization, which is "m1+2" in the formula, is preferably a number in the range of 5 to 950, more preferably a number in the range of 5 to 800, and particularly preferably a number in the range of 5 to 750. The "+2" is the sum of the siloxane units at both ends of the straight-chain molecule and may also include, in the range of 0 to 5 units, units selected from branched siloxane units represented by $R^1SiO_{3/2}$ and branched siloxane units represented by $SiO_{4/2}$. For the branched siloxane unit represented by $R^1SiO_{3/2}$, one $R^1{}_3SiO_{1/2}$ unit is added to the molecule, and for the branched siloxane unit represented by $SiO_{4/2}$, two $R^1{}_3SiO_{1/2}$ units are added to the molecule to form the molecular chain end corresponding to the branched siloxane unit.

In the above general formula, in the $R^a{}_3SiO_{1/2}$ unit at both ends, at least one of the $R^a$ is an aliphatic unsaturated carbon-carbon bond-containing group, and the other $R^a$ at both terminals is preferably an alkyl group or an aryl group, and from an industrial viewpoint, a methyl group or a phenyl group is preferable.

The properties of component (A) at room temperature are oil-like, and the viscosity of component (A) is preferably 1 mPa·s or more at 25° C. In particular, from the viewpoint of the coatability of the silicone adhesive composition of the present invention, it is preferable that the viscosity of component (A) is 1 mPa/s or more and 100,000 mPa-s or less at 25° C. On the other hand, at least a part of component (A) may be a raw rubber-like alkenyl group-containing organopolysiloxane having a viscosity at 25° C. of 100,000 mPa·s or more, or a plasticity measured in accordance with the method specified in JIS K6249 (the thickness of a spherical sample of 4.2 g at 25° C. when a load of 1 kgf is applied for 3 minutes is read to $\frac{1}{100}$ mm, and this value is multiplied by 100) in the range of 50 to 200, preferably in the range of 80 to 180.

Note that in order to prevent contact failure, etc., these alkenyl group-containing organopolysiloxanes preferably have volatile or low molecular weight siloxane oligomers (octamethyltetrasiloxane (D4), decamethylpentasiloxane (D5), etc.) reduced or eliminated. The extent of the reduction can be designed as desired, but may be less than 1 mass % of the entire component (A) and less than 0.1 mass % for each siloxane oligomer, and may be reduced to near the detection limit in gas chromatography analysis, if necessary.

Component (B) is a straight-chain organohydrogenpolysiloxane having silicon-bonded hydrogen atoms only at both terminals of the molecular chain. In the hydrosilylation reaction, it mainly functions as a chain length extender for component (A) and improves the elongation and flexibility of the curing reactant (adhesive layer). By using a specific amount of such component (B) relative to the aliphatic unsaturated carbon-carbon bond-containing group in component (A), the curing reactant obtained by curing the composition contains a certain amount of a structure in which the molecular chain length is stretched, and the adhesiveness and high temperature retention as an elastic adhesive member are remarkably improved.

Such component (B) may be a polyorganosiloxane containing SiH groups at both terminals of the molecular chain as shown in the formula below.

[Formula 1]

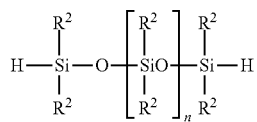

In the formula, $R^2$ is a monovalent hydrocarbon group having 1 to 10 carbon atoms, excluding an alkenyl group. The number n is in the range of 0 to 50. Monovalent hydrocarbon groups having 1 to 10 carbon atoms bonded to silicon atoms other than alkenyl groups include, for example, alkyl groups such as methyl, ethyl, propyl, butyl, pentyl, hexyl and heptyl groups; aryl groups such as phenyl, tolyl, xylyl and naphthyl groups; aralkyl groups such as benzyl and phenethyl groups; aralkyl groups such as benzyl and phenethyl groups; halogenated alkyl groups such as a chloromethyl group, a 3-chloropropyl group, a 3,3,3-trifluoropropyl group; and it is preferable in particular that the group is a methyl group or a phenyl group.

Specific examples of components (B) include, for example, 1,1,3,3-tetramethyldisiloxane, 1,1,3,3,5,5-hexamethyltrisiloxane, dimethylpolysiloxane capped at both ends of the molecular chain with dimethylhydrogensiloxy groups, dimethylsiloxane-methylphenylsiloxane copolymer capped at both ends of the molecular chain with dimethylhydrogensiloxy groups, dimethylsiloxane-diphenylsiloxane copolymer capped at both ends of the molecular chain with dimethylhydrogensiloxy groups, and a mixture of two or more types of these organopolysiloxanes.

Furthermore, examples of such component (B) further include the following organopolysiloxanes. Note that in the formulae, Me and Ph represent a methyl group and a phenyl group, respectively, m2 represents an integer from 1 to 100, and n2 represents an integer from 1 to 50.

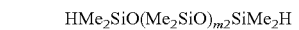

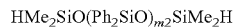

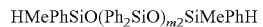

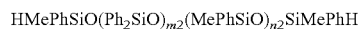

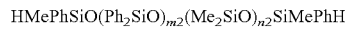

Note that in these components (B), it is preferable that volatile or low molecular weight siloxane oligomers (octamethyltetrasiloxane (D4), decamethylpentasiloxane (D5), and the like) are reduced or removed from the viewpoint of preventing contact damage. While the degree of the reduction can be designed as desired, it may be less than 1 mass % of the entire component (B) and less than 0.1 mass % for each siloxane oligomer, and may be reduced to near detection limits as necessary.

Although the content of the silicon-bonded hydrogen atom in the component (B) described above is not particularly limited, from the viewpoint of the technical effect of the present invention, the H content in the SiH group is preferably in the range of 0.01 to 3.0 mass %, and particularly preferably in a range of 0.05 to 2.00 mass %.

Component (C)

Component (C) is an organopolysiloxane resin, which is an adhesion-imparting component that imparts adhesion to the substrate, and the adhesive strength and pressure-sensitive adhesive performance of the cured material of the composition can be adjusted from slight adhesion to strong adhesion depending on the amount of the component used.

Component (C) is an organopolysiloxane resin containing in a molecule (a) a siloxane unit (M unit) as expressed by $R_3SiO_{1/2}$ (where R mutually independently represent a monovalent organic group) and (b) a siloxane unit (Q unit) as expressed by $SiO_{4/2}$. The molar ratio of M units to Q units should be 0.5 to 2.0 (M units/Q units). This is because when the molar ratio is less than 0.5, the adhesive force to the substrate may be diminished, whereas when the molar ratio is greater than 2.0, the cohesive strength of the material constituting the adhesive layer decreases.

The molar ratio of (a) M units to (b) Q units is preferably within a range of M units:Q units=0.50:1.00 to 1.50:1.00, more preferably within a range of 0.55:1.00 to 1.20:1.00, and even more preferably within a range of 0.60:1.00 to 1.10:1.00. The molar ratio can be easily measured by $^{29}Si$ nuclear magnetic resonance.

Component (C) is preferably an organopolysiloxane resin as expressed by general unit formula: $(R_3SiO_{1/2})_a(SiO_{4/2})_b$ (where R mutually independently represents a monovalent organic group, a and b are positive numbers, respectively, and a+b=1 and a/b=0.5 to 1.5).

Component (A) may be configured from only M units (a) and Q units (b), but may also contain $R_2SiO_{2/2}$ units (D units) and/or $RSiO_{3/2}$ units (T units). In the formula, R mutually independently represents a monovalent organic group. The total amount of (a) M units and (b) Q units in component (C) is preferably 50 weight % or more, more preferably 80 weight % or more, and particularly preferably 100 weight %.

Although the monovalent organic group is not particularly limited, in relation to component (D), it is preferably an aliphatic unsaturated carbon-carbon bond non-containing group.

Aliphatic unsaturated carbon-carbon bond non-containing groups include monovalent saturated hydrocarbon groups and oxygen atom-containing monovalent saturated hydrocarbon groups.

A monovalent saturated hydrocarbon group is, for example, a substituted or unsubstituted, monovalent saturated hydrocarbon group having 1 to 12 carbon atoms, preferably 1 to 8 carbon atoms, and more preferably having from 1 to 6 carbon atoms.

Examples of unsubstituted monovalent saturated hydrocarbon groups having 1 to 12 carbon atoms include methyl groups, ethyl groups, propyl groups, pentyl groups, hexyl group, octyl groups, and other alkyl groups; cyclohexyl groups, cycloheptyl groups, and other cycloalkyl groups; phenyl groups, tolyl groups, xylyl groups, and other aryl groups; benzyl groups, α-methylstyril groups, 2-phenylethyl groups, and other aralkyl groups. Examples of substituted monovalent saturated hydrocarbon groups having 1 to 12 carbon atoms include those in which a portion of hydrogen atoms of the monovalent unsaturated hydrocarbon groups are substituted by a halogen atom (fluorine, chlorine, bromine or iodine) or the like. Specific examples include: fluorinated monovalent saturated hydrocarbon groups, such as 3,3,3-trifluoropropyl groups, 4,4,5,5,5-pentafluorobutyl groups, 3,3,4,4,5,5,6,6,6-nonafluorohexyl groups, and other perfluoroalkyl groups; and chlorinated monovalent saturated hydrocarbon groups, such as 3-chloropropyl groups and other chloroalkyl groups, and dichlorophenyl groups and other chlorophenyl groups.

The monovalent saturated hydrocarbon group is preferably a substituted or unsubstituted alkyl group having 1 to 12 carbon atoms. Methyl groups are preferable as the substituted or unsubstituted alkyl groups having 1 to 12 carbon atoms.

An oxygen atom-containing monovalent saturated hydrocarbon group includes, for example, a substituted or unsubstituted oxygen atom-containing monovalent saturated hydrocarbon group having 1 to 12 carbon atoms.

Examples of substituted or unsubstituted monovalent saturated hydrocarbon group containing an oxygen atom, having 1 to 12 carbon atoms, include alkoxy groups having 1 to 12 carbon atoms and the like.

Examples of alkoxy groups having 1 to 12 carbon atoms include methoxy groups, ethoxy groups, propoxy groups, butoxy groups, isopropoxy groups, and the like.

Reduction of Hydroxyl or Hydrolyzable Groups

Hydrolyzable groups such as a hydroxyl group or alkoxy group in component (C) are directly bonded to silicon atoms such as T units or Q units among the siloxane units in the resin structure, and are groups derived from the silane used as a raw material or generated as a result of hydrolysis of the silane. The content of hydroxyl groups or hydrolyzable groups can be reduced by hydrolyzing the synthesized organopolysiloxane resin with a silylating agent such as trimethylsilane. This may suppress the formation of an organopolysiloxane resin structure having a large molecular weight in the cured material, and further improve the low-temperature curability of the composition and the storage modulus of the resulting pressure-sensitive adhesive layer.

In the present invention, component (C) is an organopolysiloxane resin represented by the general unit formula: $(R_3SiO_{1/2})_a(SiO_{4/2})_b$ (in the formula, R represents a mutually independent monovalent saturated organic group, and a and b are positive numbers, respectively, where a+b=1 and a/b=0.5 to 1.5). It is preferable that 90 mole % or more of R is independently an alkyl group or a phenyl group having 1 to 6 carbon atoms, and it is particularly preferable that 95 to 100 mole % of R is independently a methyl group or a phenyl group, and most preferable that the content of a hydroxyl group or a hydrolyzable group in component (C) is a resin (also called a MQ resin) in the range of 0 to 7 mole % of total silicon (0.0 to 1.50 mass % as a hydroxyl group).

Examples of such component (C) include:

(Me: methyl group, Ph: phenyl group, MeO: methoxy group, HO: silicon atom bonded hydroxyl group. Note that in order to express the relative amount of hydroxyl groups to silicon atoms, the total amount of the subscripts of units containing a silicon atom is set to 1, and the subscript of the $(HO)_{1/2}$ unit indicates the relative amount).

From the viewpoint of preventing contact damage, the low molecular weight siloxane oligomer in component (C) may be reduced or removed.

Since component (C) is a component that imparts adhesive strength to the silicone adhesive composition of the present invention, the compounded amount thereof is preferably in the range of 10 to 80 parts by mass when the sum of the mass of components (A) to (D) of the composition is 100 parts by mass. If the compounded amount of component (C) is less than the lower limit described above, the silicone adhesive composition of the present invention may not have sufficient adhesive strength. On the other hand, if the compounded amount of component (C) exceeds the upper limit, the silicone adhesive composition of the present invention becomes too hard and may be particularly unsuitable for use as an adhesive material. However, if a composition design of only a small amount of adhesion is required, the content of component (C) may be suppressed to 10 mass parts or less.

Component (D)

Component (D) differs from component (A) in that it is an organopolysiloxane having at least one or more aliphatic unsaturated carbon-carbon bond-containing groups at locations other than the terminals of the molecular chain of the straight-chain or branched-chain siloxane, and at least three or more aliphatic unsaturated carbon-carbon bond-containing groups in the molecule and is a component that functions as a crosslinking agent with component (B) in the hydrosilylation reaction and the amount added controls the hardness of the cured product. By using such a component (D) in a certain quantitative range, the curing reactivity of the entire composition can be improved to achieve good curing properties and suitable hardness (crosslink density), and the adhesive strength of the cured material and the surface tack after curing can be designed to be in a favorable practical range.

The aliphatic unsaturated carbon-carbon bond-containing group in component (D) is the same group as described above, of which examples include an alkenyl group, an alkenyloxyalkyl group, an acryloxyalkyl group, or a methacryloxyalkyl group, with the alkenyl group being particularly preferable. Specifically, the alkenyl group is a vinyl group, an allyl group, a propenyl group, a butenyl group, a pentenyl group, a hexenyl group, and the like, and the vinyl group or the hexenyl group is particularly preferred. These aliphatic unsaturated carbon-carbon bond-containing groups are also preferably bonded to silicon atoms.

Such a component (D) is selected from:
(D1) a straight-chain or branched-chain organopolysiloxane having at least three aliphatic unsaturated carbon-carbon bond-containing groups at the side molecular chains and a degree of siloxane polymerization of 5 to 5,000;
(D2) an organopolysiloxane that at least contains, in the molecule thereof, a siloxane unit ($M^{Vi}$ unit) expressed by (Alk) $R'_2SiO_{1/2}$ (in which Alk represents mutually independent aliphatic unsaturated carbon-carbon bond-containing groups and R' represents mutually independent aliphatic unsaturated carbon-carbon bond non-containing groups) and a siloxane unit (Q unit) represented by $SiO_{4/2}$, wherein the content of the vinyl ($CH_2$=CH—) portion in the aliphatic unsaturated carbon-carbon bond-containing group in the molecule is at least 0.1 mass %, and mixtures thereof.

Component (D1) is an organopolysiloxane having a chain-like polysiloxane structure, which may be partially branched, and having at least three aliphatic unsaturated carbon-carbon bond-containing groups at side chain locations thereof. Particularly preferable are straight-chain or branched-chain diorganopolysiloxanes capped at both ends of the molecular chain with triorganosiloxy groups, where there are at least 3 alkenyl groups at the side chain locations. In addition, the molecular chain terminal structure of component (D1) is not particularly limited, but may be capped with a non-reactive trialkylsiloxy group or triarylsiloxy group, and at least one of the silicon atom-bound organic groups in the triorganosiloxy group at both ends may be an aliphatic unsaturated carbon-carbon bond-containing group, suitably an alkenyl group. The aliphatic unsaturated carbon-carbon bond-containing groups at the side chain location and at the end of the molecular chain may be of different types. For example, a straight-chain or branched-chain diorganopolysiloxane having a hexenyl group in the side chain of the molecular chain and a vinyl group at the molecular chain terminal is encompassed in the form of a suitable component (D1) of the present invention.

Such a component (D1) is preferably a straight-chain organopolysiloxane expressed by the formula:

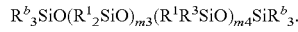

However, component (D1) may contain a range of 0 to 5 branched siloxane units as expressed by $R^1SiO_{3/2}$ or $SiO_{4/2}$ in a portion, and may be a branched organopolysiloxane.

In the formula, each $R^1$ is independently exemplified by an organic group other than an aliphatic unsaturated carbon-carbon bond-containing group, and each $R^3$ is independently exemplified by an aliphatic unsaturated carbon-carbon bond containing group. In addition, the terminal group $R^b$ is $R^3$ or $R^1$. In the formula, m3 is a number greater than or equal to 0, m4 is a number greater than or equal to 3, and the degree of siloxane polymerization, which is "m3+m4+2", is a number in the range of 5 to 5,000, preferably a number in the range of 5 to 2,000, more preferably a number in the range of 5 to 1,900, and in particular preferably a number in the range of 5 to 1,750. Note that "+2" is the sum of the siloxane units at both ends of the straight-chain molecule, and may also include branched siloxane units represented by $R^1SiO_{3/2}$ or $SiO_{4/2}$ in the range of 0 to 5. For the branched siloxane unit represented by $R^1 SiO_{3/2}$, one $R^1_3SiO_{1/2}$ unit is added to the molecule, and for the branched siloxane unit represented by $SiO_{4/2}$, two $R^1_3SiO_{1/2}$ units are added to the molecule to form the molecular chain end corresponding to the branched siloxane unit.

In the above general formula, $R^b$ in both terminal $R^b_3SiO_{1/2}$ units may all be organic groups other than aliphatic unsaturated carbon-carbon bond-containing groups, at least one of the $R^b$ may be an aliphatic unsaturated carbon-carbon bond-containing group, and the other $R^b$ may be may be an organic group other than an aliphatic unsaturated carbon-carbon bond-containing group. From an industrial point of view, the $R^b_3SiO_{1/2}$ unit at both ends may be a non-reactive trimethylsiloxy group or triphenylsiloxy group, or an alkenyl group-containing triorganosiloxy group such as a vinyl dimethyl siloxy group.

The properties of component (D1) at room temperature are oil-like or gum-like which may have plasticity, and the viscosity of component (D1) is preferably 1 mPa·s or more at 25° C. In particular, from the viewpoint of the coatability of the silicone adhesive composition of the present invention, it is preferable that the viscosity of component (D1) is 1 mPa·s or more and 100,000 mPa·s or less.

As with component (A), it is preferable that the volatile or low molecular weight siloxane oligomers be reduced or removed from these alkenyl group-containing organopolysiloxanes from the viewpoint of preventing contact damage and the like.

The organopolysiloxane which is component (D2) differs from component (A) and the component (D1), in that it has a resinous (network-like) molecular structure, and contains within the molecule a siloxane unit ($M^{Vi}$ unit) represented by (Alk) $R'_2SiO_{1/2}$ (in which Alk represents mutually independent aliphatic unsaturated carbon-carbon bond-containing groups and R' represents mutually independent aliphatic unsaturated carbon-carbon bond non-containing groups) and a siloxane unit (Q unit) represented by $SiO_{4/2}$. Here, component (D2) may include a siloxane unit (M unit) represented by $R_3SiO_{1/2}$ (in the formula, R represents mutually independent monovalent organic groups) including the $M^{Vi}$ unit, and the molar ratio of the M unit (including the $M^{Vi}$ unit) to the Q unit is preferably 0.5 to 2.0.

The aliphatic unsaturated carbon-carbon bond-containing group that is Alk in component (D) is preferably an alkenyl group, an alkenyloxyalkyl group, an acryloxyalkyl group, or a methacryloxyalkyl group as described above. Furthermore, the group not containing an aliphatic unsaturated carbon-carbon bond, which is R', is preferably an alkyl group, an aryl group, or an aralkyl group, as previously described. Furthermore, a portion of these groups may be substituted by a halogen atom or the like. From an industrial point of view, the group containing an aliphatic unsaturated carbon-carbon bond, which is Alk, is preferably a vinyl group, an allyl group, or a hexenyl group, and the group not containing an aliphatic unsaturated carbon-carbon bond, which is R', is preferably a methyl group, a phenyl group, or the like.

Since component (D2) is a component that is cured by a hydrosilylation reaction, it is preferable that the vinyl ($CH_2=CH-$) portion of the aliphatic unsaturated carbon-carbon bond-containing group in the molecule has a content of at least 0.1 mass %, and a range of 0.2 to 10.0 mass % is particularly preferable, where the content is more preferably in the range of 0.2 to 10.0 mass %, and particularly preferable in the range of 0.3 to 5.0 mass %.

The molar ratio of M units (including $M^{Vi}$ units) to Q units in component (D2) is preferably in the range of M units:Q units=0.50:1.00 to 1.50:1.00, more preferably in the range of 0.55:1.00 to 1.20:1.00, and even more preferably in the range of 0.60:1.00 to 1.10:1.00. The molar ratio can be easily measured by $^{29}Si$ nuclear magnetic resonance.

Suitably, the organopolysiloxane resin that is component (D2) is preferably an organopolysiloxane resin represented by the general unit formula:

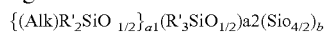

(In the formula, Alk is an aliphatic unsaturated carbon-carbon bond-containing group, R' is an aliphatic unsaturated carbon-carbon bond non-containing group, a1, a2 and b are each positive numbers, a1+a2+b=1, (a1+a2)/b=0.5 to 1.5, and a1 is a number at which the content of the vinyl ($CH_2=CH-$) portion in the aliphatic unsaturated carbon-carbon bond-containing group in the organopolysiloxane resin is at least 0.1 mass %).

Component (D2) may comprise only M units and Q units, including the $M^{Vi}$ units described above, but may also include $R_2SiO_{2/2}$ units (D units) and/or $RSiO_{3/2}$ units (T units). In the formula, R mutually independently represents a monovalent organic group. The total content of M units and Q units in component (D2) is preferably 50 weight % or more, more preferably 80 weight % or more, and particularly preferably 100 weight %.

Amount of Substance Of Aliphatic Unsaturated Carbon-Carbon Bond-Containing Groups in Component (D) in a Total Amount of 100 g of Components (A) to (D)

The composition of the present invention is hydrosilylation reaction curable, and it is preferable that the amount of substance of the aliphatic unsaturated carbon-carbon bond-containing group in component (D) in a total amount of 100 g of components (A) to (D) in the composition is preferably in the range of 0.001 to 0.030, and particularly preferably in the range of 0.001 to 0.10. An amount of substance less than the lower limit as described above may cause adhesive residue or the like, and at or more than this upper limit may cause insufficient adhesive strength.

SiH/Vi Ratio in Component (B) Compared to Components (A) and (D)

In the composition of the present invention, in addition to the SiH/Vi ratio of component (B) and component (A), the ratio of the number of moles of silicon-bonded hydrogen atoms in component (B) to the number of moles of aliphatic unsaturated carbon-carbon bond-containing groups such as alkenyl groups in component (A) and component (D) in the entire composition (material weight ratio) must be in the range of 0.70 to 1.30, and is particularly preferably in the range of 0.85 to 1.35.

Component (E)

The silicone adhesive composition of the present invention includes a hydrosilylation reaction catalyst as the component (E). Examples of hydrosilylation reaction catalysts include platinum-based catalysts, rhodium-based catalysts, and palladium-based catalysts, with platinum-based catalysts being preferable in that they markedly accelerate the curing of the present composition. Examples of this platinum based catalyst include platinum fine powder, chloroplatinic acid, an alcohol solution of chloroplatinic acid, a platinum-alkenyl siloxane complex, a platinum-olefin complex, and a platinum-carbonyl complex, with a platinum-alkenyl siloxane complex particularly preferable. Examples of this alkenyl siloxane include 1,3-divinyl-1,1,3,3-tetramethyldisiloxane, 1,3,5,7-tetramethyl-1,3,5,7-tetravinylcyclotetrasiloxane, alkenyl siloxanes in which some of the methyl groups of these alkenyl siloxanes are substituted with groups selected from the group consisting of nitriles, amides, dioxolanes, and sulfolanes, ethyl groups, phenyl groups, or the like, and alkenyl siloxanes in which the vinyl groups of these alkenyl siloxanes are substituted with allyl groups, hexenyl groups, or the like. In particular, 1,3-divinyl-1,1,3,3-tetramethyldisiloxane is preferably used because of the good stability of this platinum-alkenylsiloxane complex, and is preferably added in the form of an alkenylsiloxane solution. In addition, from the perspective of improving handling workability and pot life of the composition, these hydrosilylation reaction catalysts may be thermoplastic resin particles containing a hydrosilylation reaction catalyst, which are catalysts dispersed or encapsulated in a thermoplastic resin such as a silicone resin, a polycarbonate resin, an acrylic resin, or the like, and particularly may be thermoplastic resin particles including a hydrosilylation reaction catalyst that contains platinum. As the catalyst for promoting the hydrosilylation reaction, a non-platinum based metal catalyst such as iron, ruthenium, iron/cobalt, or the like may be used.

In the present invention, the amount of the hydrosilylation reaction catalyst is not particularly limited, but it may be relative to the total amount of solids in the composition, particularly for platinum-based metals, in the range of 0.1 to 200 ppm of the metal, may be in the range of 0.1 to 150 ppm, may well be in the range of 0.1 to 100 ppm, and may preferably be in the range of 0.1 to 50 ppm. Here, the platinum-based metal is a metal element of group VIII consisting of platinum, rhodium, palladium, ruthenium, and iridium; however, in practical use, the content of the platinum-metal excluding the ligands of the hydrosilylation catalyst is preferably within the range described above. Note that the solid content refers to the components that form the cured layer when the silicone adhesive composition of the present invention is subjected to a curing reaction (primarily the main agent, adhesion-imparting components, cross-linking agents, catalysts and other non-volatile components), and does not include volatile components such as solvents that volatilize during and possibly after heat curing.

If the content of a metal, preferably a platinum-based metal, in the silicone adhesive composition of the present invention is 50 ppm or less (45 ppm or less, 35 ppm or less, 30 ppm or less, 25 ppm or less, or 20 ppm or less), it may be possible to suppress discoloration or coloring of the transparent pressure-sensitive adhesive layer, especially after curing or exposure to high energy rays such as heating or ultraviolet rays. On the other hand, from the viewpoint of the curability of the organopolysiloxane composition, the content of the metal, preferably a platinum-based metal, is 0.1 ppm or more, and a content below this lower limit may cause curing failure.

Component (F)

Component (F) is a curing retarder, which is blended to inhibit a crosslinking reaction between the aliphatic unsaturated carbon-carbon bond-containing groups and the silicon bond hydrogen atoms in the composition, to extend usable time at room temperature, and to improve storage stability. A curing retarder is preferably used when desired to increase the usable time of the curable silicone pressure-sensitive adhesive composition of the present invention. In particular, for practical purposes, a curing retarder is preferably used in the silicone adhesive composition of the present invention.

Specific examples of component (E) include acetylenic compounds, enyne compounds, organic nitrogen compounds, organic phosphorus compounds, and oxime compounds. Specific examples include: alkyne alcohols such as 3-methyl-1-butyne-3-ol, 3,5-dimethyl-1-hexyne-3-ol, 3-methyl-1-pentyne-3-ol, 1-ethynyl-1-cyclohexanol, phenyl butanol, and the like; ene-yne compounds such as 3-methyl-3-pentene-1-yne, 3,5-dimethyl-1-hexyne-3-yne, and the like; methylalkenylcyclosiloxanes such as 2-ethynyl-4-methyl-2-pentene, 1,3,5,7-tetramethyl-1,3,5,7-tetravinylcyclotetrasiloxane, 1,3,5,7-tetramethyl-1,3,5,7-tetrahexenyl-cyclotetrasiloxane, and the like, as well as benzotriazoles.

From the viewpoint of the curing behavior of the composition, the silicone adhesive composition of the present invention should have an increase in viscosity within 1.5 times after 8 hours at room temperature after preparation of the composition, and should be curable at 80 to 200° C. Suppressed thickening is important from the viewpoint of handling workability, pot life, and post-curing properties, because curing at a high temperature (80 to 200° C.) above a certain level ensures curability. Note that such a composition can be achieved by selecting a suitable combination and compounded amounts of each of the components described above, the hydrosilylation catalyst, and component (F).

Viscosity of the Entire Composition

The silicone adhesive composition of the present invention is not particularly limited in terms of the viscosity of the entire composition at 25° C. However, from the viewpoint of coatability, the viscosity of the entire composition is in the range of 1,000 to 500,000 mPa·s and preferably in the range of 1,000 to 250,000 mPa·s. In particular, when the content of the organic solvent is less than 20 mass % of the entire composition, the viscosity of the entire composition may and is preferred to be in the range of 1,000 to 500,000 mPa·s.

Solvent-Based or Solvent-Free/Low-Solvent Compositions

The silicone adhesive composition of the present invention may be a solvent type composition or a solvent-free/low-solvent type composition, and the organic solvent content thereof may be selected as appropriate according to the desired dosage form and method of use. In recent years, there has been demand for solvent-free/low-solvent compositions from the viewpoint of reducing environmental burden and improving the working environment, and the silicone adhesive composition of the present invention can achieve sufficient coating performance in practical use even in the solvent-free/low-solvent type. However, in practical application of the present invention, there is nothing to prevent the design and use of silicone adhesive compositions using organic solvents in excess of 20 mass % of the total composition.

Each of the components in the present invention is compatible with the design of a solvent-free or low-solvent composition, and if desired, the organic solvent content may be less than 20 mass % of the total composition, less than 15 mass %, or in the range of 0-5 mass %. It goes without saying that it is possible to design a solvent-free composition with essentially 0 mass % of organic solvent content. In addition, a small amount of organic solvent may be included if the purpose is to improve the wettability of the composition to the substrate, or if it is inevitable as a solvent associated with each component.

The type and blending amount of the organic solvent is adjusted taking the coating workability, etc. into consideration. Exemplary organic solvents include a selection of one or more of the following: aromatic hydrocarbon-based solvents such as toluene, xylene, and benzene; aliphatic hydrocarbon-based solvents such as heptane, hexane, octane, and isoparaffin; ester-based solvents such as ethyl acetate and isobutyl acetate; ether-based solvents such as diisopropyl ether and 1,4-dioxane; chlorinated aliphatic hydrocarbon-based solvents such as trichloroethylene, perchloroethylene, and methylene chloride; and solvent volatile oils, with two or more types capable of being combined in accordance with the wettability of the sheet-like substrate or the like.

The silicone adhesive composition of the present invention may optionally contain components other than the components described above to the extent that the technical effects of the present invention are not impaired. For example, the composition may contain: an adhesion promoter; a non-reactive organopolysiloxane such as a polydimethylsiloxane or a polydimethyldiphenylsiloxane; an antioxidant such as a phenol-type, a quinone-type, an amine-type, a phosphorus-type, a phosphite-type, a sulfur-type, or a thioether-type antioxidant; a flame retardant such as a phosphate ester-type, a halogen-type, a phosphorus-type, or an antimony-type flame retardant; and one or more types of antistatic agents consisting of a cationic surfactant, an anionic surfactant, a non-ionic surfactant, or the like. Note that, in addition to these components, pigments, dyes, inorganic microparticles (reinforcing fillers, dielectric fillers, conductive fillers, thermally conductive fillers), etc. can be optionally blended.

(A') Chain Organopolysiloxane which does not Contain a Carbon-Carbon Double Bond-Containing Reactive Group in the Molecule The silicone adhesive composition of the present invention can be blended with a non-reactive organopolysiloxane such as polydimethylsiloxane or polydimethyldiphenylsiloxane which contains neither a carbon-carbon double bond-containing reactive group such as an alkenyl group, an acrylic group, or a methacrylic group nor a silicon bonded hydrogen atom, which may improve the loss factor (tanδ), storage modulus (G'), and loss modulus (G") of the pressure-sensitive adhesive layer described below. For example, the loss coefficient of the pressure sensitive adhesive layer can be increased using a polydimethylsiloxane or polydimethyldiphenylsiloxane having a hydroxyl group terminal, with such compositions included within the scope of the present invention.

The method of preparing the silicone adhesive composition of the present invention is not particularly limited and is performed by homogeneously mixing the respective components. A solvent may be added as necessary and the composition may be prepared by mixing at a temperature of from 0 to 200° C. using a known stirrer or kneader.

The organopolysiloxane composition of the present invention forms a coating film when applied to a substrate and forms a cured product by heating under temperature conditions of from 80 to 200° C. and preferably under temperature conditions of from 90 to 190° C. Examples of application methods include gravure coating, offset coating, offset gravure, roll coating, reverse roll coating, air knife coating, curtain coating, and comma coating.

Range of Pressure Sensitive Adhesion and Adhesive Force

The silicone adhesive composition of the present invention is characterized in that the cured layer formed by curing said composition by a hydrosilylation reaction is a pressure-sensitive adhesive. Because the pressure sensitive adhesive layer according to the present invention has the abovementioned configuration and expresses sufficient adhesive force for practical use, a known silicone pressure sensitive adhesive can be replaced and used as desired.

Specifically, a pressure-sensitive adhesive layer having an adhesive force in the range of 100 to 2,500 gf/inch measured at a tensile speed of 300 mm/min using a 180° peel test method according to JIS Z 0237 relative to a SUS substrate of a pressure-sensitive adhesive layer having a thickness of 40 μm made by curing the silicone adhesive composition of the present invention can be designed, and a pressure-sensitive adhesive layer in the range of 500 to 2,250 gf/inch is suitable. Note that the thickness (40 μm) described above is the thickness of the cured layer itself serving as a reference for objectively defining the adhesive force of the cured layer of the present invention. It goes without saying that the organopolysiloxane composition of the present invention is not limited to a thickness of 40 μm and may be used as a cured layer or a pressure-sensitive adhesive layer of any thickness.

Use as a Pressure Sensitive Adhesive Layer

The cured product of the present invention can, in particular, be used as a pressure sensitive adhesive layer. In addition, in order to improve adhesion with the adherend, surface treatments such as primer treatment, corona treatment, etching treatment, or plasma treatment may be performed on the surface of the pressure sensitive adhesive layer or the substrate. However, because the pressure sensitive adhesive layer according to the present invention has excellent adhesion to a substrate of a display device, etc. as described above, these steps may be added, as required, to further improve adhesion with the adherend, with a higher production efficiency capable of being achieved by eliminating these steps.

The silicone adhesive composition of the present invention is cured by applying the composition to a release liner, then heating under the temperature conditions described above, and after the release liner is peeled off and the composition is attached to a film-like substrate, a tape-like substrate, or a sheet-like substrate (hereinafter, referred to as a "film-like substrate") or applied to a film-like substrate, curing by heating at the temperature conditions described above so as to form a pressure sensitive adhesive layer on the surface of the substrate can be performed. A laminate provided with a cured layer, in particular, a film-like pressure sensitive adhesive layer, obtained by curing the organopolysiloxane composition of the present invention on these film-like substrates may be used for adhesive tapes, adhesive bandages, low-temperature supports, transfer films, labels, emblems, and decorative or explanatory signs. Further, a cured layer obtained by curing the organopolysiloxane composition of the present invention may be used to assemble automobile parts, toys, electronic circuits, or keyboards. Alternatively, a cured layer formed by curing the organopolysiloxane composition of the present invention, particularly a film-like pressure sensitive adhesive layer, may be used in the construction of a laminated touch screen or flat panel display.

Examples of substrate types include: paperboard, cardboard paper, clay-coated papers, polyolefin laminate papers, particularly polyethylene paper laminate, synthetic resin films and sheets, natural fiber woven materials, synthetic fiber woven materials, artificial leather woven materials, and metal foils. In particular, synthetic resin films and sheets are preferable, and examples of synthetic resins include: polyimides, polyethylenes, polypropylenes, polystyrenes, polyvinyl chlorides, polyvinylidene chlorides, polycarbonates, polyethylene terephthalates, cyclopolyolefins, and nylon (registered trademark). When heat resistance is required, a heat-resistant synthetic resin film such as a polyimide, polyetheretherketone, polyethylene naphthalate (PEN), liquid crystal polyacrylate, polyamide-imide, polyether sulfone, and the like is particularly preferable. Meanwhile, for applications such as a display device in which visibility is required, a transparent substrate and specifically a transparent material such as a polypropylene, polystyrene, polyvinylidene chloride, polycarbonate, polyethylene terephthalate, PEN, and the like is preferable.

The substrate is preferably a film-like or a sheet-like substrate. The thickness thereof is not particularly limited and can be designed with a desired thickness in accordance with the application. Furthermore, in order to improve adhesion between a supporting film and pressure sensitive adhesive layer, a supporting film subjected to a primer treatment, corona treatment, etching treatment, or plasma treatment may be used. Furthermore, the opposite surface of the film-like substrate from the pressure sensitive adhesive layer surface may be subjected to surface treatments such as a treatment for scratch prevention, grime prevention, fingerprint adhesion prevention, anti-glare, anti-reflection, anti-static, or other treatment.

As the application method of the silicone adhesive composition to the substrate, gravure coating, offset coating, offset gravure, roll coating using an offset transfer roll coater, reverse roll coating, air knife coating, curtain coating using a curtain flow coater or the like, comma coating, meyer bar, or other known methods used for the purpose of forming a cured layer may be used without limitation.

The coating amount of the silicone adhesive composition on the substrate can be designed at a desired thickness in accordance with the application such as a display device; for example, the thickness of the pressure sensitive adhesive layer after curing may be from 1 to 1,000 μm, from 5 to 900 μm, or from 10 to 800 μm; however, there is no limitation thereto.

The pressure sensitive adhesive layer according to the present invention may be a single layer or a multilayer structure obtained by laminating two or more pressure sensitive adhesive layers in accordance with the required characteristics. The multi-layered pressure-sensitive adhesive layer may be made by laminating pressure-sensitive adhesive films made one layer at a time, or by performing the process of coating and curing the silicone adhesive composition multiple times, such as on a film substrate with a release layer.

The pressure-sensitive adhesive layer according to the present invention may serve as other functional layers selected from a dielectric layer, conductive layer, heat dissipation layer, insulating layer, reinforcing layer, and the like, in addition to providing adhering or sticking functions between members.

When the cured layer obtained by curing the silicone adhesive composition of the present invention is a pressure-sensitive adhesive layer, in particular, a pressure sensitive adhesive film, the cured layer is preferably treated as a laminate film that is peelably adhered to a film substrate provided with a release layer having a release-coating capability. The release layer may also be referred to as a release liner, separator, peel layer, or release coating layer, and is suitably a release layer having a release coating capability such as a silicone release agent, fluorine release agent, alkyd release agent, or fluorosilicone release agent. Alternatively, without a release layer, an adhesive layer may be formed on the substrate itself, which has physically formed minute irregularities on the surface of the substrate or on a substrate made of a material that has difficulty adhering to the pressure-sensitive adhesive layer of the present invention. In particular, in the laminates of the present invention, it is preferable to use, as the release layer, a release layer comprising a cured fluorosilicone release agent.

The cured product obtained by curing the silicone adhesive composition according to the present invention has both viscoelasticity and adhesive strength as described above, making it useful as a member of various types of electronic equipment or electrical devices as elastic adhesive members. In particular, it is useful as an electronic material, a member for a display device, or a member for a transducer (including sensors, speakers, actuators, and generators), with a suitable application for the cured product being a member for an electronic part or a display device. The cured product according to the present invention may be transparent or opaque, wherein, in particular, a film-shaped cured product, particularly a substantially transparent pressure-sensitive adhesive film, is suitable as a member for a display panel or a display, and is particularly useful in so-called touch panel applications in which a device, particularly an electronic device, can be operated by touching a screen with a fingertip or the like. Moreover, the opaque elastic adhesive layer is not required to have transparency, making it particularly useful for applications of film-like or sheet-like members used in sensors, speakers, actuators, etc. which require constant elasticity or flexibility in the adhesive layer itself.

Use as an Adhesive Tape

An article containing the adhesive comprising the silicone adhesive composition of the present invention may be an adhesive tape, and is characterized in that it is provided with a sheet-like member comprising a synthetic resin film/sheet, metal foil, woven fabric, non-woven fabric, paper or other textile product as described above, and the adhesive layer described above. The types of such adhesive tapes are not particularly limited, and includes insulating tapes, heat-resistant tapes, solder masking tapes, mica tape binders, temporary fixing tapes (including in particular temporary fixing tapes for silicone rubber parts, and the like), splicing tapes (including in particular splicing tapes for silicone release paper).

In particular, the pressure sensitive adhesive layer obtained by curing the silicone adhesive composition according to the present invention is capable of achieving a pressure sensitive adhesive characteristic equivalent to conventional silicone pressure sensitive adhesive layers, and can improve adhesion to a substrate of a display device and the like without causing problems due to poor curing or reduced curability.

Laminates and Pressure-Sensitive Adhesive Sheets

Next, laminates and the pressure-sensitive adhesive sheets, which are types of the pressure-sensitive adhesive layer described above, will be described.

The laminate body according to the present invention is a laminate body provided with a pressure-sensitive adhesive layer made up of a cured silicone adhesive composition described above on the film-like substrate described above, and suitably a release layer for said pressure-sensitive adhesive layer is provided on these film-like substrates.

In the laminate body according to the present invention, the sheet-like substrate is preferably provided with at least one release layer, and for the release layer to be in contact with the pressure-sensitive adhesive layer. This allows the pressure-sensitive adhesive layer to be easily peeled off from the sheet-like substrate. The release agent included in the release layer is not particularly limited, and as above, examples include silicone release agents, fluorine release agents, alkyd release agents, and fluorosilicone release agents.

In particular, the laminate body of the present invention may be able to handle the pressure-sensitive adhesive layer separated from the film-like substrate alone, and there may be two film-like substrates. Specifically can be provided with:
a film-like substrate;
a first release layer formed on the film-like substrate;
a pressure-sensitive adhesive layer formed by coating and curing the silicone adhesive composition described above on the release layer; and
a second release layer laminated on the pressure-sensitive adhesive layer.

Similarly, the laminate body of the above form may be formed, for example, by coating and curing the silicone adhesive composition described above on one of the release layers formed on the film-like substrate to form a pressure-sensitive adhesive layer, and then laminating another release layer on said pressure-sensitive adhesive layer.

The laminate body of the above form may be produced, for example, by sandwiching the silicone adhesive composition described above between the first film-like substrate and the second film-like substrate, forming the composition to a certain thickness by pressing or rolling while heating, and then curing the composition.

The first sheet substrate may be provided with a first release layer, or the first sheet substrate itself may be provided with releasability. Similarly, the second sheet substrate may be provided with a second release layer, or the second sheet substrate itself may be provided with releasability. When the first sheet substrate and/or the second sheet substrate is provided with a first release layer and/or a second release layer, the pressure-sensitive adhesive layer is preferably in contact with the first release layer and/or the second release layer.

For example, the sheet substrate having releasability includes a sheet substrate made of a material having releasability such as a fluoroplastic film, or a sheet substrate made of a material having no or low releasability such as a polyolefin film to which a release agent such as silicone or fluoroplastic has been added. On the other hand, the sheet substrate provided with the release layer includes, for example, a polyolefin film coated with a release agent such as silicone or fluoro resin.

The laminate of the present invention can be used, for example, by peeling off the pressure-sensitive adhesive layer from the film-like substrate adhered to the adherend after applying the pressure-sensitive adhesive layer to the adherend.

The thickness of the pressure-sensitive adhesive layer is preferably 5 to 10,000 μm, of which 10 μm or more or 8,000 μm or less, of which 20 μm or more or 5,000 μm is particularly preferable.

Member for Display Panel or Display

A cured product obtained by curing the silicone adhesive composition of the present invention can be used in the construction of a laminated touch screen or flat panel display, with the specific method of use thereof capable of being a known method of use of a pressure sensitive adhesive layer (in particular, silicone PSA) without any particular limitation.

For example, a cured product obtained by curing the composition of the present invention can be used as an optically transparent silicone pressure-sensitive adhesive film or adhesive layer as disclosed in the Japanese Unexamined Patent Application Publication No. 2014-522436 or Japanese Unexamined Patent Application Publication No. 2013-512326, or the like, and can be used in the manufacture of display devices such as touch panels. Specifically, the cured product resulting from curing the composition of the present invention can be used as an adhesive layer or an adhesive film as described in Japanese Unexamined Patent Application Publication No. 2013-512326 without any particular limitation.

As an example, the touch panel of the present invention may be a touch panel including a substrate such as a conductive plastic film on which a conductive layer is formed on one side, and a cured layer comprising a cured composition of the present invention adhered to the side on which the conductive layer is formed or on the opposite side thereof. The substrate is preferably a sheet-like or film-like substrate, with an example thereof being a resin film or a glass plate. The substrate on which the conductive layer is formed may be a resin film or a glass plate, in particular a polyethylene terephthalate film, on which an ITO layer is formed on one surface. These are disclosed in the above-described Japanese Unexamined Patent Application Publication 2013-512326 and other publications.

In addition, the cured product obtained by curing the silicone adhesive composition of the present invention may be used as an adhesive film for a polarizing plate used in manufacturing a display device such as a touch panel, and may be used for bonding between a touch panel and a display module as described in Japanese Unexamined Patent Application 2013-065009 as a pressure-sensitive adhesive layer.

INDUSTRIAL APPLICABILITY

Applications of the silicone adhesive composition and a cured product obtained by curing the same according to the present invention are in no way limited to the disclosure above, with a pressure sensitive adhesive film provided with a cured product obtained by curing the composition capable of being used in various display devices for displaying characters, symbols, and images such as television receivers, computer monitors, monitors for personal digital assistants, monitoring monitors, video cameras, digital cameras, mobile phones, personal digital assistants, displays for instrument panels of automobiles or the like, displays for instrument panels of various equipment, devices, and instruments, automatic ticket machines, automated teller machines, on-board display devices, and on-board transmission screens. The surface shape of such a display device may be a curved shape or a bowed shape rather than a flat surface, with examples thereof including curved displays or curved transmission screens used in automobiles (including electric vehicles), aircraft, or the like in addition to various flat panel displays (FPDs). Furthermore, these displaying devices can display, on a screen or display, icons for executing functions or programs, notification displays such as e-mail programs or the like, and operation buttons for various devices such as car navigation devices, membranes for speakers, audio devices, air conditioning devices, and the like. A touch panel function that enables an input operation may be added by touching a finger on the icons, notification displays, and operation buttons. Application is possible as a device for CRT displays, liquid crystal displays, plasma displays, organic EL displays, inorganic EL displays, LED displays, surface electrolytic displays (SEDs), field emitting displays (FEDs), and other displaying devices, or touch panels using the displaying devices. Moreover, the cured product obtained by curing the composition has excellent adhesion and viscoelastic characteristics, enabling the use thereof as a film-like or sheet-like member which is a member for transducers such as a membrane for speakers (including a sensor, speaker, actuator, etc.), in addition to also being capable of being used as a sealing layer or adhesive layer used in a secondary battery, fuel cell, or solar cell module.

A pressure sensitive adhesive layer obtained by curing the silicone adhesive composition according to the present invention may be substantially transparent, without causing problems such as poor curing or reduced curability, and has excellent adhesion to substrates of various display devices, etc. Therefore, the pressure sensitive adhesive layer can be suitably used in a vehicle display device with good visibility and operability of the display content over an extended period of time, and in particular, a vehicle display device having a curved screen or curved display and optionally equipped with a touch panel function. For example, vehicle display devices equipped with curved display surfaces are disclosed in Japanese Unexamined Patent Application Publication No. 2017-047767, Japanese Unexamined Patent Application Publication No. 2014-182335, Japanese Unexamined Patent Application Publication No. 2014-063064, Japanese Unexamined Patent Application Publication No. 2013-233852, and the like; however, the pressure sensitive adhesive layer of the present invention can be suitably applied or replaced as part or all of an adhesive layer or a pressure sensitive adhesive layer for which transparency is required in these documents. Further, it goes without saying that the silicone adhesive composition of the present invention may be used as a substitute for currently used adhesive layers or pressure-sensitive adhesive layers requiring transparency for other known curved display devices as well, and in order to further leverage the advantages of the pressure-sensitive adhesive of the present invention, it is preferable to adjust the design of the display device or the thickness of the member using known techniques.

Note that the transparent film-like substrate provided with the pressure sensitive adhesive layer of the present invention may be used for the purpose of scratch prevention, dirt prevention, fingerprint adhesion prevention, static prevention, glare prevention, peep prevention, and the like of these display surfaces.

EXAMPLES

Examples 1 to 11 and Comparative Examples 1 to 3

Examples of the present invention and comparative examples are described hereinafter. Note that "cured" in each of the examples and comparative examples means that each composition has fully cured under the respective curing conditions.

Preparation of a Curing-Reactive Silicone Adhesive Composition

Silicone adhesive compositions with the cure reactivity shown in each of the examples and comparative examples were prepared using each of the components shown in Table 1. Note that all percentages in Table 1 refer to percentages by mass.

Measurement of the Molecular Weight of the Organopolysiloxane Component

Using gel permeation chromatography (GPC) available from Waters and tetrahydrofuran (THF) as a solvent, the weight average molecular weight (Mw) and number average molecular weight (Mn) of organopolysiloxane components such as organopolysiloxane resin were determined in terms of standard polystyrene.

Adhesive Strength Measurement, Film Surface

Each composition was applied to a PET film (available from Toray Co., Ltd., product name: Lumirror (registered trademark) S10, thickness: 50 μm) such that the thickness after curing was 40 μm, after which it was cured for 3 minutes at 150° C. After leaving it for one day, the sample was cut to a width of 20 mm and the adhesive layer side was attached to a SUS plate (made by Paltech) using a roller to make a test piece. The test specimens were measured for adhesive strength (measurement at a width of 20 mm was converted to the indicated unit gf/inch) at a tensile speed of 300 mm/min using a 180° peel test method in accordance with JIS Z0237 using an Orientec RTC-1210 tensile tester. The surface of the film was observed when it was peeled off, and the composition of the adhesive remaining on the SUS plate was judged as having adhesive residue. For Examples 8 to 13 and Comparative Example 2, a dilution solvent (toluene) was added to the composition to make it 48 mass %, and coating was performed (Table 2).

[Peeling force: ball tack value] The adhesive sheet made in the same way as above was placed on a slope at an angle of 30° from the horizontal direction, and a specified stainless steel ball was rolled over it three times from above. The ball tack value was the largest of the ball numbers whose rolling distance on the adhesive sheet was within 10 cm at least two out of three times.

High Temperature Holding Power

The silicone pressure-sensitive adhesive agent composition was coated on a polyimide resin film to a thickness of 40 μm, and then dried at 150° C. for 3 minutes to create an adhesive film. It was pasted on a SUS plate, and a 200 g weight was hung at the bottom of the SUS plate and aged in an oven at 200° C. for 30 minutes. The distance that the SUS plate moved against the polyimide resin film after aging was measured.

The materials of the curing reactive organopolysiloxane compositions are shown in Table 1. The viscosity or plasticity of each component was measured at room temperature (25° C.) using the following method.

Viscosity

Viscosity (mPa·s) is a value measured using a rotational viscometer in accordance with JIS K7117-1.

The following silicone components and others were used for each component in the table. A xylene solution of the silicone resin in component (C) was added to a pre-mixed mixture of component (A) and component (B), and the xylene was removed under reduced pressure. In Table 1 and Table 2, the ratio of the number of moles of silicon bonded hydrogen atoms in component (B) to the number of moles of aliphatic unsaturated carbon-carbon bond-containing groups in components (A) and (D) is described as the SiH/Vi ratio.

Component A1

Alkenyl group-containing polysiloxane represented by the following formula (vinyl group content: 6.3 mass %)

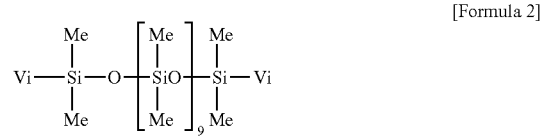

[Formula 2]

Component A2

Alkenyl group-containing polysiloxane represented by the following formula (vinyl group content: 1.54 mass %)

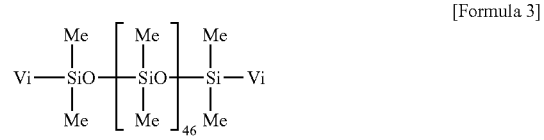

[Formula 3]

Component A3

Alkenyl group-containing polysiloxane represented by the following formula (vinyl group content: 0.14 mass %)

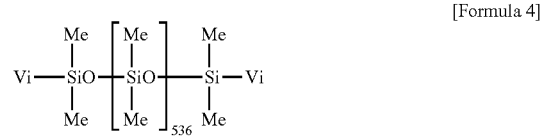

[Formula 4]

Component A4

Vinyl functional polydimethylsiloxane, gum-like state (plasticity 152), vinyl group content 0.013 mass %

Component A5

Alkenyl group-containing polysiloxane represented by the following formula (vinyl group content: 0.09 mass %)

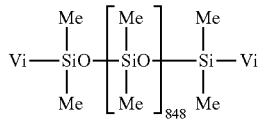

[Formula 5]

Component B1

Polysiloxane-containing SiH groups represented by the following formula (silicon atom bonded hydrogen atom content 0.14 mass %)

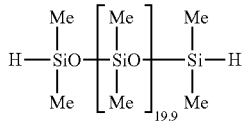

[Formula 6]

Component C1

MQ silicone resin consisting of $(CH_3)_3SiO_{1/2}$ units, $SiO_{4/2}$ units and hydroxyl groups, weight average molecular weight (Mw) by polystyrene conversion 6,500, OH content 4.5 mole % (1.0 mass %), xylene solution (solid content 70 mass %)

Component C2

MQ silicone resin consisting of $(CH_3)_3SiO_{1/2}$ and $SiO_{4/2}$ units and hydroxyl groups, weight average molecular weight (Mw) 4,500 by polystyrene conversion, OH content 4.5 mole % (1.0 mass %), xylene solution (solid content 70 mass %)

Component D1

Alkenyl silicone with a hexenyl group in the side chain having a viscosity of 330 mPas and a vinyl group content of 1.26 mass %.

Component D2

Alkenyl silicone with vinyl groups on both ends and hexenyl groups on the side chains, having a viscosity of 100 mPas and a vinyl group content of 2.7 mass %.

Component D3

Alkenyl silicone having a vinyl group on the side chain of the molecular chain with a viscosity of 600 mPas and a vinyl group content of 1.22 mass %.

Component D4

Average unit formula: Organopolysiloxane (vinyl group content 3.17 mass %) represented by:

$(Me_2ViSiO_{1/2})_{0.07}(Me_3SiO_{1/2})_{0.44}(SiO_{4/2})_{0.49}$

Component D5

Average unit formula: Organopolysiloxane (vinyl group content 18.7 mass %) represented by:

$(Me_2ViSiO_{1/2})_{0.55}(Me_3ViSiO_{1/2})_{0.05}(SiO_{4/2})_{0.40}$

TABLE 1

| Component | Example 1 | Example 2 | Example 3 | Example 4 | Example 5 | Example 6 | Example 7 | Comparative Example 1 |
|---|---|---|---|---|---|---|---|---|
| A1 (%) | 11.35 | 11.62 | 11.20 | 13.15 | 10.82 | 10.1 | 12.35 | 12.95 |
| A2 (%) | | | 1.402 | | | | | |
| A3 (%) | | | | | | 6 | | |
| B1 (%) | 21.65 | 24.08 | 24 | 26.85 | 22.68 | 21.6 | 25.35 | 25.05 |
| C1 (%) | 60 | 60 | 60 | 60 | 58 | 58 | | 60 |
| C2 (%) | | | | | | | 58 | |
| D1 (%) | 7 | | | | | | | 2 |
| D2 (%) | | 4.3 | | | | 4.3 | 4.3 | |
| D3 (%) | | | | | 8.5 | | | |
| D4 (%) | | | | 3.4 | | | | |
| D5 (%) | | | | | 0.57 | | | |
| Platinum content ppm | 10 ppm | 10 ppm | 10 ppm | 10 ppm | 10 ppm | 10 ppm | 10 ppm | 10 ppm |
| Methylbutynol (%) | 0.4 | 0.4 | 0.4 | 0.4 | 0.4 | 0.4 | 0.4 | 0.4 |
| Number of moles of component D in 100 g of silicone | 0.003 | 0.004 | 0.004 | 0.004 | 0.004 | 0.004 | 0.004 | 0.0009 |

TABLE 1-continued

| Component | Example 1 | Example 2 | Example 3 | Example 4 | Example 5 | Example 6 | Example 7 | Comparative Example 1 |
|---|---|---|---|---|---|---|---|---|
| SiH/Vi ratio | 0.9 | 0.96 | 0.95 | 0.96 | 0.958 | 0.96 | 0.96 | 0.98 |
| Viscosity | — | 60225 | 166875 | 36975 | 48825 | 50100 | 17700 | — |
| Film surface | No adhesive residue | No adhesive residue | No adhesive residue | No adhesive residue | No adhesive residue | No adhesive residue | No adhesive residue | Adhesive residue present |
| Adhesive strength gf/inch | 1638 | 1413 | 1463 | 1430 | 1125 | 975 | 950 | 388 |
| Tack | 32 | 32 | 19 | 27 | 16 | 31 | 30 | 14 |
| High temperature holding power | 0.05 | 0.025 | 0.05 | 0.05 | 0.05 | 0.03 | 0.05 | Fall |

TABLE 2

| | Example 8 | Example 9 | Example 10 | Example 11 | Example 12 | Example 13 | Comparative Example 2 |
|---|---|---|---|---|---|---|---|
| A4 (%) | 30.101 | 36.47 | 32.145 | 38.515 | | | 39.042 |
| A5 (%) | | | | | 29.5 | 35.746 | |
| B1 (%) | 4.199 | 4.23 | 4.235 | 4.265 | 4.8 | 4.954 | 0.548 |
| C1 (%) | 60.3 | 53.9 | 62.9 | 56.5 | 60.3 | 53.9 | 60 |
| D2 (%) | 5.4 | 5.4 | | | 5.4 | 5.4 | 0.41 |
| D5 (%) | | | 0.72 | 0.72 | | | |
| Amount of platinum | 10 ppm | 10 ppm | 10 ppm | 10 ppm | 10 ppm | 10 ppm | 10 ppm |
| Methylbutynol (%) | 0.4 | 0.4 | 0.4 | 0.4 | 0.4 | 0.4 | 0.4 |
| Diluted solvent | Toluene | Toluene | Toluene | Toluene | Toluene | Toluene | Toluene |
| Number of moles of component D in 100 g of silicone | 0.005 | 0.005 | 0.005 | 0.005 | 0.005 | 0.005 | 0.0004 |
| SiH/Vi ratio | 0.997 | 0.997 | 0.997 | 0.997 | 0.989 | 0.987 | 0.99 |
| Film surface | No adhesive residue | No adhesive residue | No adhesive residue | No adhesive residue | No adhesive residue | No adhesive residue | Adhesive residue present |
| Adhesive strength | 2000 | 1500 | 2500 | 1700 | 1700 | 1025 | 750 |
| Tack | 15 | 19 | 8 | 19 | 9 | 23 | 17 |
| High temperature holding power | 0.05 | 0.05 | 0.05 | 0.05 | 0.05 | 0.05 | Fall |

SUMMARY

The silicone adhesive compositions of Examples 1 to 7, even as solvent-free compositions, were in the viscosity range sufficient for practical coating and were superior in terms of curing and adhesive properties of the resulting adhesive layer. On the other hand, when the compounded amount of component (D) is less than the specified amount, curing becomes insufficient, the cured material leaves a glue residue on the adherend, and a sufficient value for high temperature holding power could not be achieved.

Although the silicone adhesive compositions of Examples 8 to 13 are solvent-type compositions, they were practically coat-able, and the curing properties and adhesive properties of the resulting adhesive layers were sufficiently excellent for practical use. On the other hand, when the compounded amount of component (D) was less than the specified amount, curing was insufficient, the cured material left a glue residue on the adherend, and sufficient properties for high temperature holding power could not be achieved.

The invention claimed is:

1. A silicone adhesive composition, comprising:
   (A) a straight-chain or branched chain organopolysiloxane having at least two aliphatic unsaturated carbon-carbon bond-containing groups at the ends of the molecular chains and a degree of siloxane polymerization in the range of 5 to 10,000;
   (B) a straight-chain organohydrogenpolysiloxane having silicon-bonded hydrogen atoms only at both terminals of the molecular chain;
   (C) an organopolysiloxane resin containing, in a molecule, a siloxane unit as expressed by $R_3SiO_{1/2}$, where R mutually independently represents a monosaturated organic group and a siloxane unit as expressed by $SiO_{4/2}$;
   (D) an organopolysiloxane having at least one or more aliphatic unsaturated carbon-carbon bond-containing groups at locations other than the terminals of the molecular chain of the straight-chain or branched-chain siloxane, and having at least three or more aliphatic unsaturated carbon-carbon bond groups in the molecule; and (E) a hydrosilylation reaction catalyst;

where:

the ratio of the number of moles of silicon-bonded hydrogen atoms in component (B) to the number of moles of aliphatic unsaturated carbon-carbon bond-containing groups in components (A) to (D) is in the range of 0.70 to 1.30, and the amount of substance of the aliphatic unsaturated carbon-carbon bond-containing groups in component (D) is in the range of 0.001 to 0.030 when compared to 100 g of the total amount of components (A) to (D) in the composition.

2. The silicone adhesive composition according to claim 1, wherein when the total amount of components (A) to (D) is 100 parts by mass, the total amount of components (A) and (B) is in the range of 10 to 80 parts by mass, the amount of component (C) is in the range of 10 to 80 parts by mass, and the amount of component (D) is in the range of 0.01 to 20 parts by mass.

3. The silicone adhesive composition according to claim 1, wherein component (D) is component (D1), component (D2), or a mixture thereof, as follows:

(D1) a straight-chain or branched-chain organopolysiloxane having at least three aliphatic unsaturated carbon-carbon bond-containing groups at the side molecular chains and a degree of siloxane polymerization of 5 to 5,000;

(D2) an organopolysiloxane that at least contains, in the molecule thereof, a siloxane unit expressed by (Alk) $R'_2SiO_{1/2}$ in which Alk represents mutually independent aliphatic unsaturated carbon-carbon bond-containing groups and R' represents mutually independently aliphatic unsaturated carbon-carbon bond non-containing groups and a siloxane unit represented by $SiO_{4/2}$, wherein the content of a vinyl portion in the aliphatic unsaturated carbon-carbon bond-containing group in the molecule is at least 0.1 mass %.

4. The silicone adhesive composition according to claim 1, wherein an organic solvent content is 20 mass % or less of the entire composition.

5. The silicone adhesive composition according to claim 1, wherein a pressure-sensitive adhesive layer having a thickness of 40 μm obtained by curing the composition has an adhesive force, measured at a tensile speed of 300 mm/min using the 180° peel test method according to JIS Z0237 relative to a SUS substrate, in the range of 100 to 2500 gf/inch.

6. A pressure-sensitive adhesive layer comprising a cured product of the silicone adhesive composition according to claim 1.

7. A laminate body provided with, on a substrate, a pressure-sensitive adhesive layer comprising a cured product of the silicone adhesive composition according to claim 1.

8. The laminate body according to claim 7, wherein one or two or more film-like substrates are included, and a release layer for the pressure-sensitive adhesive layer is provided on the film layers.

9. A laminate body, comprising:

a film-like substrate;

a first release layer formed on the film-like substrate;

a pressure-sensitive adhesive layer formed by coating and curing the silicone adhesive composition according to claim 1 on the release layer; and a second release layer laminated on the pressure-sensitive adhesive layer.

10. An elastic adhesive member comprising a cured product of the silicone adhesive composition according to claim 1.

11. Electronic equipment or electrical devices that include the elastic adhesive member according to claim 10.

12. The silicone adhesive composition according to claim 1, wherein when the total amount of components (A) to (D) is 100 parts by mass, the amount of component (D) is in the range of 0.01 to 20 parts by mass.

* * * * *